United States Patent
Panoushek et al.

(10) Patent No.: US 9,943,031 B2
(45) Date of Patent: Apr. 17, 2018

(54) PROCESS FOR WINDROW CHUTE CLEAN OUT WHILE OPERATING AN AGRICULTURAL HARVESTER

(71) Applicant: CNH Industrial America LLC, New Holland, PA (US)

(72) Inventors: Dale W. Panoushek, Orion, IL (US); Craig E. Murray, Davenport, IA (US); Justin L. Montenguise, Bettendorf, IA (US); Nicholas S. Shane, Bennett, IA (US)

(73) Assignee: CNH Industrial America LLC, New Holland, PA (US)

( * ) Notice: Subject to any disclaimer, the term of this patent is extended or adjusted under 35 U.S.C. 154(b) by 88 days.

(21) Appl. No.: 15/070,891

(22) Filed: Mar. 15, 2016

(65) Prior Publication Data

US 2017/0265390 A1  Sep. 21, 2017

(51) Int. Cl.
| | | |
|---|---|---|
| *A01D 41/12* | (2006.01) | |
| *A01D 90/10* | (2006.01) | |
| *A01F 7/06* | (2006.01) | |
| *A01F 12/44* | (2006.01) | |

(52) U.S. Cl.
CPC ......... *A01D 41/1243* (2013.01); *A01D 90/10* (2013.01); *A01F 7/06* (2013.01); *A01F 12/444* (2013.01)

(58) Field of Classification Search
CPC . A01D 41/1243; A01D 41/1276; A01F 12/00; A01F 12/58
See application file for complete search history.

(56) References Cited

U.S. PATENT DOCUMENTS

| | | | |
|---|---|---|---|
| 1,064,654 A | 6/1913 | Jerome | |
| 4,111,210 A | 9/1978 | Freeman et al. | |
| 5,372,546 A | 12/1994 | Brakke | |
| 5,930,988 A | 8/1999 | Hanson | |
| 6,582,298 B2 | 6/2003 | Wolters | |
| 6,800,025 B2 | 10/2004 | Pope et al. | |
| 6,863,605 B2* | 3/2005 | Gryspeerdt | A01F 12/40 460/111 |
| 7,086,942 B2* | 8/2006 | Niermann | A01D 41/1243 460/111 |
| 7,220,179 B2* | 5/2007 | Redekop | A01F 12/40 460/112 |
| 7,544,126 B2* | 6/2009 | Lauer | A01D 41/1243 460/111 |
| 7,706,948 B2 | 4/2010 | Dix et al. | |

(Continued)

*Primary Examiner* — John Weiss
(74) *Attorney, Agent, or Firm* — Patrick M. Sheldrake

(57) ABSTRACT

A spreader arrangement for an agricultural harvester includes a windrow chute having a first position for building a windrow in which the chute angles downwardly from a proximal edge to a distal edge of the chute, and a second position for cleanout of the chute in which the chute angles downwardly from the distal edge to the proximal edge of the chute. Adjustment from the first position to the second position and back to the first position can occur automatically when the combine is operating but not currently harvesting, such as during the time period between when a harvesting swath is completed and the next harvesting swath is commenced, so that accumulated crop residue material can be dislodged from the windrow chute without disrupting harvesting or the windrow building process.

16 Claims, 4 Drawing Sheets

(56) References Cited

U.S. PATENT DOCUMENTS

| | | | |
|---|---|---|---|
| 9,107,345 B2* | 8/2015 | Patterson | A01F 12/58 |
| 9,137,944 B2* | 9/2015 | Dilts | A01D 41/1243 |
| 9,497,903 B2* | 11/2016 | Biggerstaff | A01D 41/1243 |
| 9,578,803 B2* | 2/2017 | Desmet | A01D 41/1243 |
| 9,667,710 B2* | 5/2017 | Wilbur | H04L 67/10 |
| 2014/0366502 A1 | 12/2014 | Miller | |
| 2015/0011275 A1 | 1/2015 | Murray et al. | |
| 2015/0011276 A1 | 1/2015 | Murray et al. | |
| 2015/0351321 A1* | 12/2015 | Shane | A01D 41/1243 460/1 |
| 2016/0316622 A1* | 11/2016 | Duquesne | A01D 41/1243 |

\* cited by examiner

PROCESS FOR WINDROW CHUTE CLEAN OUT WHILE OPERATING AN AGRICULTURAL HARVESTER

BACKGROUND OF THE INVENTION

1. Field of the Invention

The present invention relates generally to agricultural equipment, such as harvesters, and more specifically, to windrowing arrangements on such harvesters, and still more specifically to clean out of crop material from a windrower chute.

2. Description of the Related Art

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. After the grain is threshed, it falls through perforations in the concaves onto a grain pan. From the grain pan, the grain is cleaned in a cleaning system, and is then transported to a grain tank onboard the combine. A cleaning fan blows air through the sieves to discharge straw, chaff and other debris toward the rear of the combine.

During the process of harvesting, crop material other than grain (MOG) is intended to be expelled from the combine. This material is usually derived from one of two areas in the combine, the threshing rotor or the cleaning system. The material expelled from the threshing rotor is generally referred to as straw, and the material expelled from the cleaning system is generally referred to as chaff. This material, or crop residue, typically is discharged from the combine by processes of either spreading or windrowing.

Spreading is accomplished using a mechanical device referred to as a spreader, which distributes the straw and/or chaff substantially evenly from the rear of the combine. Commonly, the spread material is chopped to as short a length as possible so that when the chopped material is spread onto the field it will break down quickly and not interfere with subsequent tilling or seeding operations.

Windrowing refers to the process of dropping straw directly behind the combine in a continuous stream, often substantially narrower than the combine cutting width. The purpose for windrowing is usually to facilitate post-harvest processing of the straw for uses other than incorporating the straw back into the field. For example, straw can be further processed by shaping it into bales that are removed from the field so that the straw can be used for other purposes such as, for example, animal feed or bedding, ground cover or mulch, or other purposes. When the straw is windrowed, it is known to allow the straw to pass through the combine with little interference and with little or no chopping, so that the straw remains as close as possible to its original length and condition.

U.S. Patent Application Publication Nos. 2015/0011275A1 and 2015/0011276A1 (which are assigned to the assignee of the present invention) disclose a spreader arrangement and actuation linkage mechanism therefor that simply and effectively allows both spreading and windrowing from the rear of the harvester. A selectively movable swath door at the upper rear of the straw hood is movable between a first position directing crop material to the spreader discs, and a second position directing crop material to a windrow chute. The windrow chute folds up and out of the way to the rear of the straw hood when the spreader arrangement is in the spreading mode, and is lowered to receive and direct the straw when windrowing is the desired handling process.

Although the windrow chute is substantially smooth and downwardly angled when in use, so that the straw and other material will slide easily along the chute, in some harvesting conditions the crop material can accumulate along the upper edge of the windrow chute. The long strands of straw can overhang the top edge of the chute, and can be pinned in a space between the edge of the windrow chute and adjacent structures of the harvester. When harvesting in moist conditions, either from atmospheric moisture or moisture in the crop itself, sticking of the crop material in the windrow chute can occur. If crop material is allowed to accumulate on the chute or at the upper edge of the chute, the continued buildup can cause malfunction of the windrower or perhaps even complete plugging.

To prevent problems associated with crop material buildup in the windrow chute, a person operating the combine can stop periodically to remove any accumulated crop material. However, this prolongs the harvesting operation, and may do so needlessly if little accumulation has occurred. Alternatively, the operator can wait until the accumulation is significant; however, this can make the cleaning process more difficult and time-consuming.

What is needed in the art is a procedure to clean a windrow chute of accumulated material, without interrupting or slowing the harvesting process.

SUMMARY OF THE INVENTION

The present invention provides a process for clearing a windrower of an agricultural combine whereby the windrow chute of the combine is raised periodically to discharge any accumulated material without interrupting the harvesting process or interfering with the windrowing procedure.

In one embodiment, a process for cleanout while operating an agricultural harvester spreader arrangement includes steps of operating the agricultural harvester with the windrow chute in a lowered position; determining an appropriate time for cleanout; continuing to operate the agricultural harvester; rotating the windrow chute to an inverted position while continuing to operate the agricultural harvester; and rotating the windrow chute back to the lowered position while continuing to operate the agricultural harvester.

In another embodiment, a process for cleanout of a windrow chute in an agricultural harvester while operating the agricultural harvester, the process comprising steps of: completing a harvesting swath; continuing to operate the agricultural harvester without receiving additional crop material in the agricultural harvester; rotating a windrow chute from a windrowing position to a cleanout position while continuing to operate the agricultural harvester; and thereafter rotating the windrow chute from the cleanout position back to the windrowing position.

In still another embodiment, a process for operating an agricultural harvester, includes steps of harvesting crop material in a series of harvesting swaths; moving the agricultural harvester between harvesting swaths without harvesting crop material while completing the step of moving; and performing a windrow chute cleanout while performing the step of moving the agricultural harvester between harvesting swaths.

An advantage of the present invention is that crop material accumulated on a windrow chute can be dislodged and removed without stopping the combine or the harvesting process and without interfering with proper formation of a windrow.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, and such exemplification is not to be construed as limiting the scope of the invention in any manner.

DETAILED DESCRIPTION OF THE INVENTION

Figure 1:
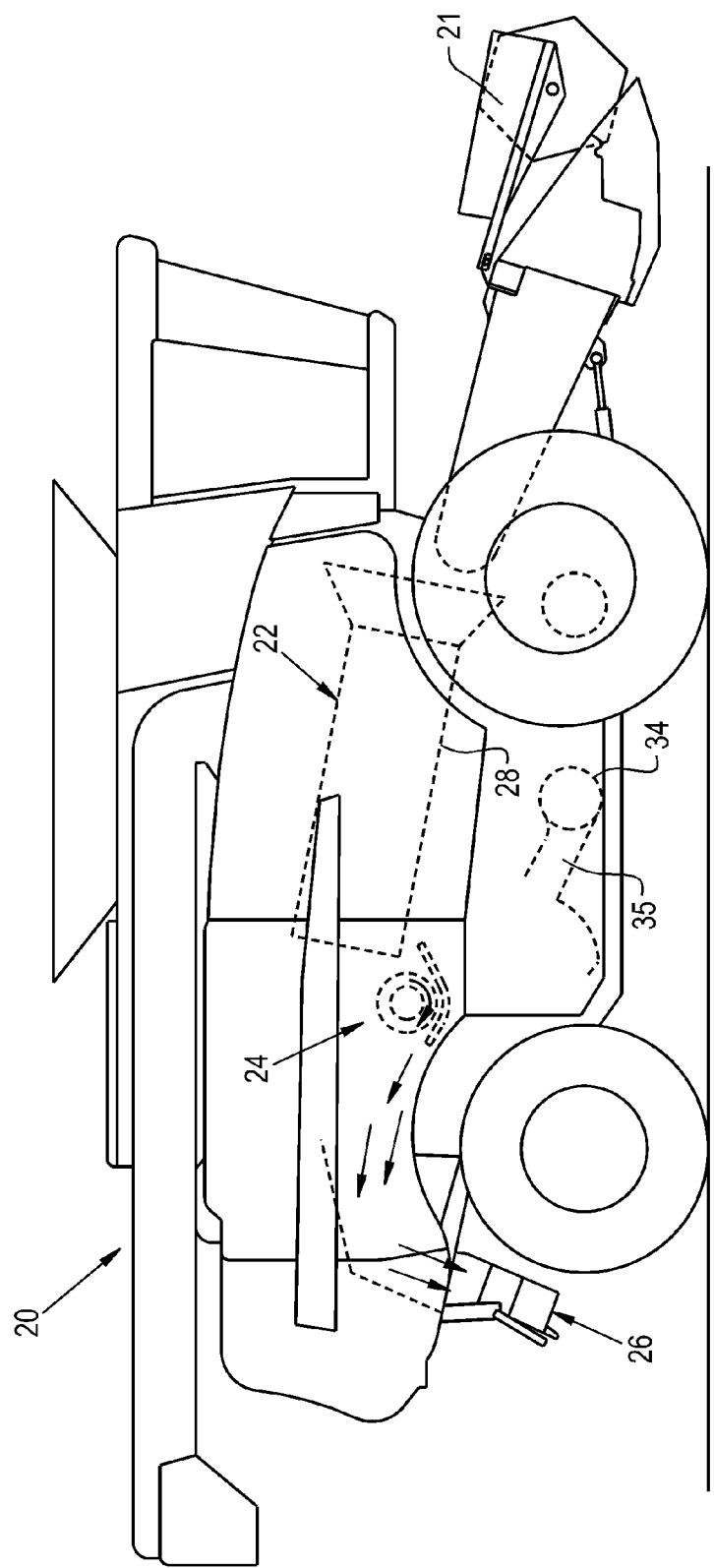
FIG. 1 is a side view of an embodiment of an agricultural harvester in the form of a combine having a windrower which may be operated using the method disclosed herein.

Referring now to the drawings more specifically, FIG. 1 shows an agricultural combine 20 which includes the commonly known and understood harvesting apparatus (not all of which is shown to facilitate an understanding of the invention). The agricultural combine 20 may be used to harvest grains such as barley, corn, flax, oats, rye, soybeans, wheat, and so forth. Accordingly, the combine 20 is configured to remove the desired portion of the plant and to separate the harvested plant material into different agricultural materials (e.g., grain, straw, and chaff). As discussed above, the harvester discharges this material after processing it.

More specifically, an appropriate harvesting head 21 removes the desired portion of the crop, an axially oriented crop processing system 22 receives the harvested crop and a crop residue treatment and distribution system 24 with a crop residue spreader arrangement 26 is positioned at the aft end of combine 20. The crop processing system 22 includes a cylindrical threshing rotor 28 that conveys a flow of crop material in a helical flow path. As the crop material is moved through the processing system 22, the desired crop portion, such as grain or other material, is loosened and separated from crop residue such as husks and pods in a cleaning system located beneath the threshing rotor 28. The crop processing system 22 includes a blower 34, (schematically depicted) to aid in the separation of the desired crop from the crop residue. The blower 34 has a duct 35 extending aft in the combine 20 towards the cleaning system and the crop residue treatment and distribution system 24.

Figure 2:
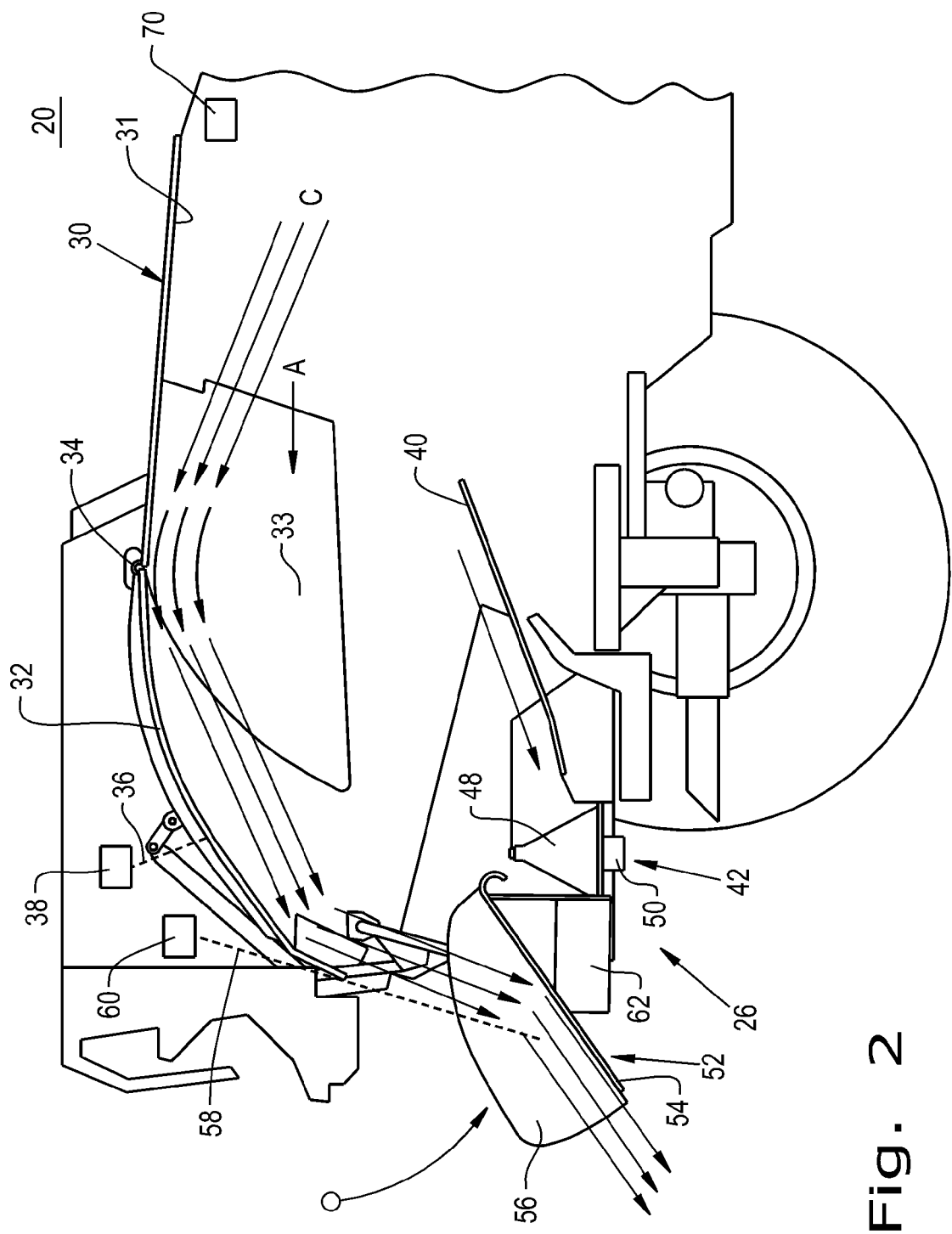
FIG. 2 is a side cross-sectional view of the harvester shown in FIG. 1 and illustrating the crop residue being deposited in a windrow.
Figure 5:
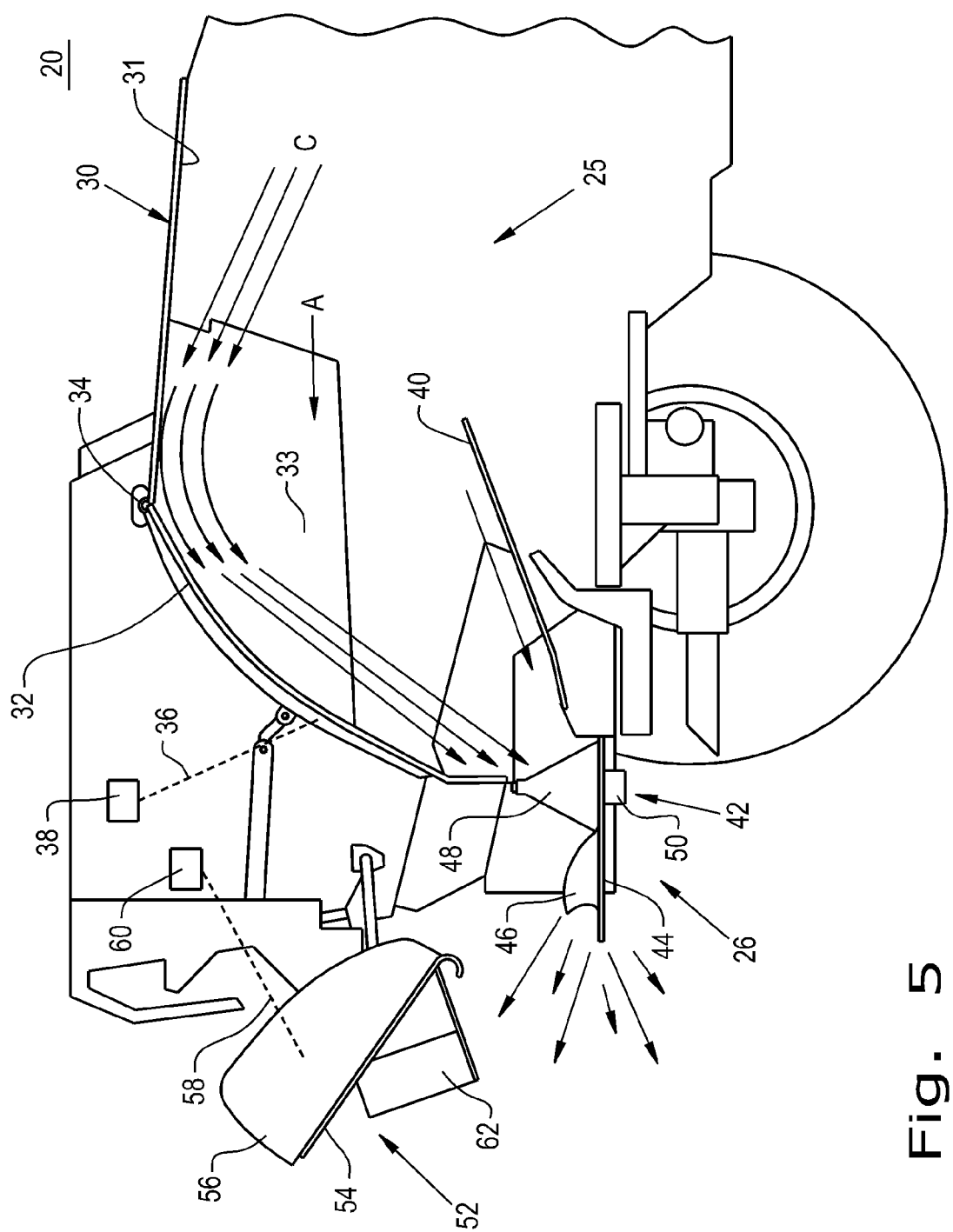
FIG. 5 is a side cross-sectional view similar to FIG. 2, but illustrating the harvester adjusted for spreading the crop residue.

Specifically referring now to FIG. 2, the crop residue spreader arrangement 26 comprises a duct 30 including a top wall 31 and sidewalls 33 to direct crop residue in an aft direction A. A swath door 32 spans the sidewalls of the duct 30 and is pivotally mounted at 34 to be displaced between the position shown in FIG. 2 for windrowing to a downwardly directed position when all crop residue is discharged from the combine by spreading (FIG. 5). As shown in schematic fashion, the swath door 32 is displaced by a mechanical interconnection 36 to an actuating mechanism 38, both shown in schematic fashion. Although many different elements may be used to displace swath door 32 between its positions, the mechanism described in the aforementioned co-pending applications, of common assignment with the present invention, is preferred. A fixed floor 40 directs the crop residue stream towards a pair of side by side spreader devices 42, one such device 42 being visible in the side views of the drawings.

Referring now to FIG. 5, each spreader device 42 includes a disk 44 journaled for rotation about a vertical axis and positioned laterally with respect to one another. Each disk 44 may have a plurality of curved bats 46 that act like vanes to positively direct crop residue in a lateral direction. A cone 48 extends vertically upward from disk 44 and provides a cover for a motor 50 for each disk. The motor output shafts (not shown) cause the disks 44 to rotate as needed. Although motor 50 is illustrated as hydraulic, it may be in any one of a number of forms including mechanical interconnection to a remotely positioned motor. Rotation of disks 44 is set up so that when viewed from above and looking towards the front of the combine 20, the right side disk rotates counterclockwise and the left disk rotates clockwise so that they propel crop residue between them aft and around and laterally.

In the position illustrated in FIG. 5, both the straw and chaff are directed aft in direction A and are deflected downward by swath door 32 to impact on the disks 44 and curved bats 46. The rotation of the disks 44 causes the material to be distributed aft and laterally of the combine 20 in a spreading operation.

A windrow chute generally indicated at 52 is provided. Windrow chute 52 acts as a chute or trough to direct the crop material toward a windrow formed behind harvester 20. Windrow chute 52 includes a bottom portion 54 and adjacent sidewalls 56. Bottom portion 54 is tapered in a rearward direction as particularly shown in FIG. 3. Windrow chute 52 is displaceable between the position illustrated in FIGS. 2 and 3 in which it is positioned to receive crop material and form a windrow, and the position illustrated in FIGS. 4 and 5 in which it is inverted. Windrow chute 52 is displaced between the described and illustrated positions by a mechanical connection 58 leading to an actuator 60. While many forms of mechanical connections and actuators may be employed for this purpose, the apparatus referred to in the above identified co-pending applications is referenced as suitable therefor. Windrow chute 52 additionally may include deflectors 62 fixed to and projecting downwardly from bottom portion 54. Deflectors 62 are curved to conform to the circumference of horizontal spreader disks 44. Windrow chute 52 further defines an inner or proximal edge 64 and an outer or distal edge 66.

As shown in FIG. 2, the swath door 32 may be pivoted by the actuator 38 to the illustrated first position in which it is elevated and does not direct the entire crop residue stream towards the spreading devices 26. At the same time, the actuator 60 displaces the windrow chute 52 to the illustrated first position in which it is in the crop residue stream. While the use of two actuators is shown, it should be understood that straw door 32 and windrow chute 52 can be connected physically, so that a single actuator can be used to move both. In the crop residue stream, the straw tends to be elevated and as such is directed downward to the windrow chute 52, and the impact of the straw against the chute slows the velocity of the straw. In addition, the convergence of sidewalls 56 of the windrow chute 52 enables a better formed windrow of straw, which is directed downstream of the combine 20. The angular position of the windrow chute 52 downwardly from proximal edge 64 to distal edge 66 provides a path for the downward flow of crop residue material to form a windrow upon exiting the combine. At the same time, the chaff in the crop residue stream falls to the residue spreader arrangement 26, and the deflectors 62 keep the air flow from the disks 44 out of the windrow for the straw so that it does not disturb the proper positioning of the windrow in the field. The chaff in this condition is spread laterally.

Figure 3:
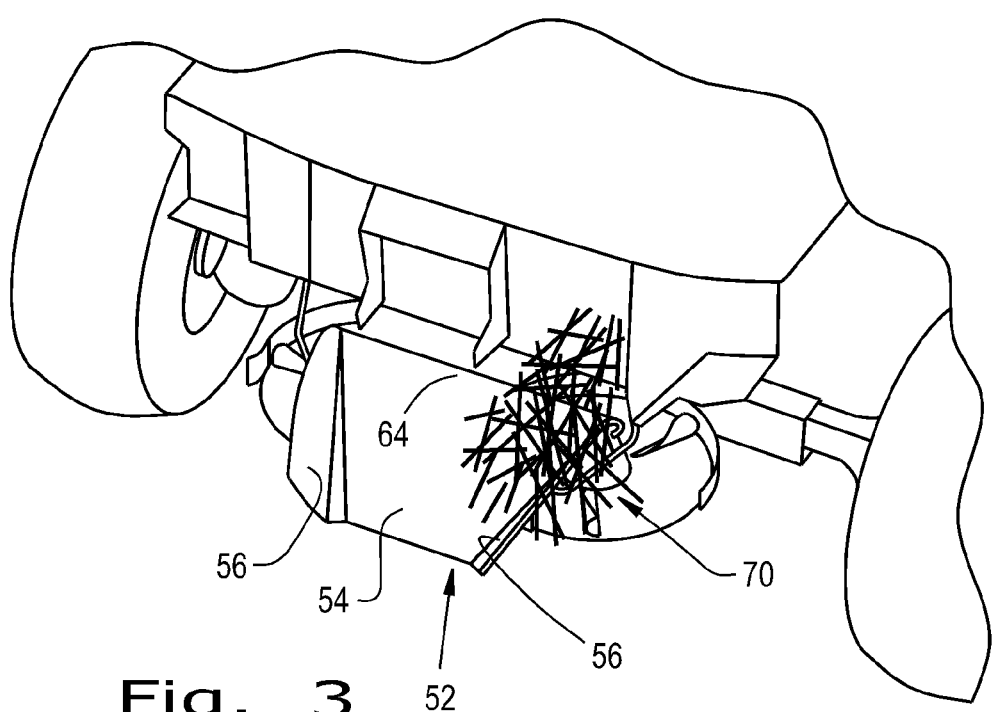
FIG. 3 is an enlarged, fragmentary perspective view of the windrow chute in the harvester shown in FIGS. 1 & 2, and illustrating the manner in which crop residue can accumulate on the windrow chute.

Under some operating conditions, such as when high moisture is present, a clump 70 of crop residue material can cling to the windrow chute 52, particularly along proximal edge 64 of windrow chute 52, as depicted in FIG. 3. The crop residue material can become pinned in a naturally occurring small space between proximal edge 64 and the adjacent structures of residue spreader arrangement 26. If a clump of crop residue material continues to grow at proximal edge 64 of windrow chute 52, the regular flow of crop material into windrow chute 52 can be inhibited, even to the point of causing malfunction of residue spreader arrangement 26.

Figure 4:
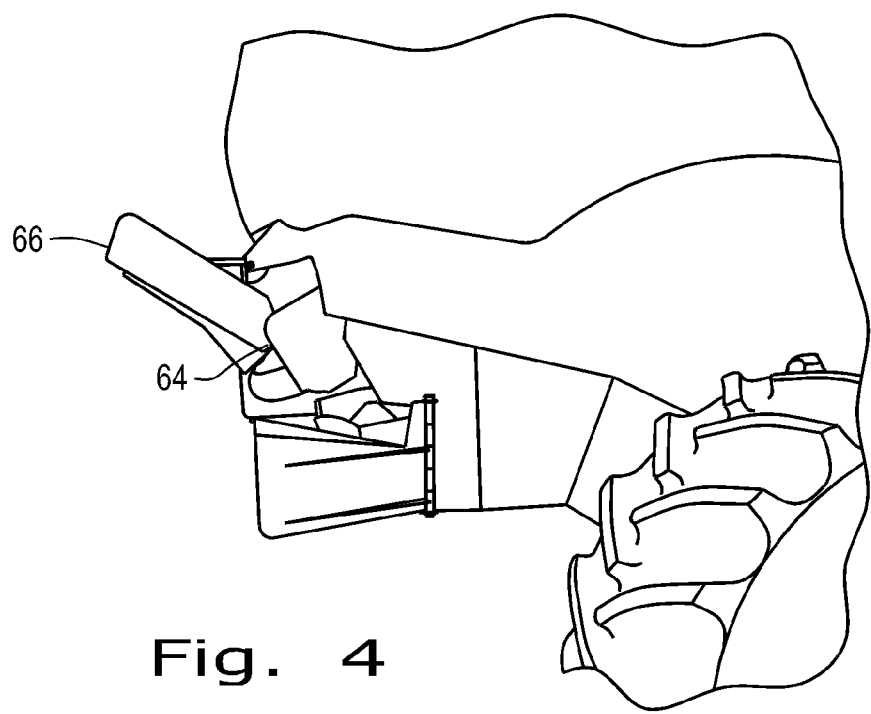
FIG. 4 is a side view illustrating the chute in an elevated position whereby accumulated crop material is disengaged from the windrow chute.

To dislodge a building clump of crop residue material, windrow chute 52 is rotated to an elevated position in which the chute is substantially inverted, as illustrated in FIG. 4. In this inverted position, distal edge 66 is substantially higher than proximal edge 64 such that the chute angles steeply downward from the distal edge to the proximal edge. As windrow chute 52 is rotated to this position, the space between inner, proximal edge 64 and adjacent structures of residue spreader arrangement 26 is expanded, thereby releasing any crop material pinned between the windrow chute and adjacent structures. The released crop material can then fall away from the combine, and windrow chute 52 can then be returned to its lowered first position for windrow formation.

Moving the windrow chute 52 for clean out can be independent of its adjustment for changing between windrowing and spreading functions. Accordingly, windrow chute 52 can operate independently of swath door 32. Combine 20 can continue to be adjusted for and operating in the windrowing process, except for the rotation of windrow chute 52. Alternatively, total adjustment to the spreading process configuration also can be used.

Actuation of the adjustment of windrow chute 52 for clean out purposes can be by an operator determining that it is an appropriate time for cleanout and manually manipulating of controls to rotate windrow chute 52 to the inverted position and then back again to the lower position. Alternatively, actuation can be automated through an existing processor/controller 70, which receives a variety of data and inputs concerning operating conditions of various systems in combine 20, as those skilled in the art will understand readily. As such, processor/controller 70 can be connected by wired or wireless connection to a variety of sensors, systems, actuators and controllers in the combine, including actuators 38 and 60 for sending operating signals to the actuators simultaneously when adjusting from one process of spreading or windrowing to the other process. For clean out purposes only actuator 60 need be operated; however, a brief total adjustment to the aforedescribed spreading process configuration can be used as well, immediately followed by a total readjustment back to the windrowing process configuration.

While operation of actuator 60 can occur at timed intervals or when a sensed condition indicates that a clump is building in windrow chute 52, this can be disruptive of the windrowing process if performed while combine 20 is actively harvesting. In a typical harvesting process, opposite ends of a field are first harvested and thereafter the combine is operated in a back-and-forth manner across the field between the harvested ends. When the combine exits from a completed harvesting swath, it is turned in the areas of the previously harvested ends to operate in a second harvesting swath in the opposite direction. While the turn is being made, the combine harvesting head 21 is raised and the combine begins to empty of crop material as no additional crop material enters the combine. Accordingly, adjusting windrow chute 52 to its clean out position at this time is not disruptive of windrow formation and does not delay the harvesting operation. The windrow chute 52 is returned to its proper windrowing position for the next harvesting swath. An operator can determine that a harvesting swath has been completed and initiate cleanout while the combine is being turned in the previously harvested area.

Processor/controller 70 receives a variety of data and information about the combine status, performance and operation for monitoring and adjustment purposes. This same data and information can be used by processor/controller 70 to determine when to adjust windrow chute 52 for clean out. In a GPS controlled system, the GPS location can be used to determine that the end of the harvesting swath has been cleared and/or that the combine is turning. Alternatively, or additionally one or more other condition can be used. By way of example and not limitation, processor/controller 70 will commonly receive data and information about chopper speed, header height adjustment, header engagement or actuation and/or ground speed. This same data and information can be used for determining when to activate cleanout. Determination that the chopper is in low-speed indicates that windrowing is occurring in that high-speed chopper operation is indicative of a spreading process, not windrowing. Header height being in a lifted position indicates that the machine is not currently harvesting, such as when the header is lifted as the combine is being turned to position for another harvesting swath. Header engagement and ground speed greater than zero indicate that the combine is still running. It will be apparent to those skilled in the art that these conditions are merely exemplary of conditions that will indicate when the combine is operating, adjusted for windrowing, and not currently harvesting crop material. These can be used for determining a preferred time period for adjusting windrow chute 52 to the cleanout position, when it will not be disruptive of harvesting or the windrowing process.

For a crop residue spreading operation, as shown in FIG. 5, the windrow chute 52 is in a second, elevated position in which it is out of the crop residue stream, and the swath door 32 is in its second, lowered position in which it directs all of the crop residue stream towards the spreading devices 26

The actuators 38 and 60 are coordinated to place the swath door 32 and windrow chute 52 in their respective positions in coordinated interdependent fashion when the combine is being adjusted from either windrowing or spreading to the other thereof. The actuators may be implemented in a way that it is done by control from an operator of the harvester. However, this adjustment is separate and independent from the aforedescribed adjustment of the windrow chute 52 separately and independently for cleanout during a windrowing process. Alternatively, as described previously, a single actuator can be used to operate both swath door 32 and windrow chute 52.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A process for cleanout while operating an agricultural harvester spreader arrangement in a windrowing function, with a windrow chute movable between lowered and inverted positions, said process comprising steps of:
    operating the agricultural harvester with the windrow chute in the lowered position;
    determining an appropriate time for cleanout;
    continuing to operate the agricultural harvester;
    rotating the windrow chute to the inverted position while continuing to operate the agricultural harvester; and
    rotating the windrow chute back to the lowered position while continuing to operate the agricultural harvester.

2. The process of claim 1, wherein said determining step includes determining that the agricultural harvester is operating between a completed harvesting swath and a next harvesting swath.

3. The process of claim 2, wherein said determining step is performed by visual observation.

4. The process of claim 1, wherein said determining step is performed by evaluating operation and adjustment of the agricultural harvester.

5. The process of claim 4, wherein said determining step includes ascertaining that at least one of the following conditions exists:
    the agricultural harvester is adjusted to a windrowing function;
    the header height positioning is elevated;
    the header is engaged for operation; and
    the ground speed of the agricultural harvester is greater than zero.

6. The process of claim 4, wherein said step of operating the agricultural harvester includes operating in individual harvesting swaths separated by moving the agricultural harvester through previously harvested areas; and said steps of rotating the windrow chute are performed while moving the agricultural harvester through the previously harvested areas.

7. The process of claim 4, wherein said determining step includes determining that the agricultural harvester is operating in a windrowing function and that the agricultural harvester is moving and not currently receiving crop material.

8. The process of claim 1, wherein said step of operating the agricultural harvester includes operating in individual harvesting swaths separated by moving the agricultural harvester through previously harvested areas; and said steps of rotating the windrow chute are performed while moving the agricultural harvester through the previously harvested areas.

9. A process for cleanout of a windrow chute in an agricultural harvester while operating the agricultural harvester, the process comprising steps of:
    completing a harvesting swath;
    continuing to operate the agricultural harvester;
    rotating a windrow chute from a windrowing position to a cleanout position while continuing to operate the agricultural harvester; and
    thereafter rotating the windrow chute from the cleanout position back to the windrowing position.

10. The process of claim 9, wherein said step of rotating the windrow chute from the cleanout position back to the windrowing position is performed while continuing to operate the agricultural harvester without receiving additional crop material in the agricultural harvester.

11. The process of claim 9, wherein said step of rotating the windrow chute from the windrowing position to the cleanout position is performed while continuing to operate the agricultural harvester without receiving additional crop material in the agricultural harvester.

12. The process of claim 11, wherein said step of rotating the windrow chute from the cleanout position back to the windrowing position is performed while continuing to operate the agricultural harvester without receiving additional crop material in the agricultural harvester.

13. The process of claim 12, wherein said steps of rotating the windrow chute are performed by cycling the agricultural harvester from a windrowing process to a spreading process and back to a windrowing process.

14. The process of claim 9, wherein said steps of rotating the windrow chute are performed by cycling the agricultural harvester from a windrowing process to a spreading process and back to a windrowing process.

15. A process for operating an agricultural harvester, comprising steps of:
    harvesting crop material in a series of harvesting swaths;
    moving the agricultural harvester between harvesting swaths without harvesting crop material while completing said moving; and
    performing a windrow chute cleanout while performing said step of moving the agricultural harvester between harvesting swaths; and
    wherein said step of performing a windrow chute cleanout including rotating the windrow chute between a windrow forming position and an inverted position.

16. A process for operating an agricultural harvester, comprising steps of:
    harvesting crop material in a series of harvesting swaths;
    moving the agricultural harvester between harvesting swaths without harvesting crop material while completing said moving; and
    performing a windrow chute cleanout while performing said step of moving the agricultural harvester between harvesting swaths;
    wherein said step of performing a windrow chute cleanout including cycling the agricultural harvester from a windrowing process to a spreading process and back to a windrowing process between harvesting swaths.

* * * * *